United States Patent [19]

Lenderking et al.

[11] 4,356,397

[45] Oct. 26, 1982

[54] OPTICAL VALVE POSITION SENSOR SYSTEM

[75] Inventors: Bruce N. Lenderking, Glen Burnie, Md.; Donald P. Garrett, Jacobus, Pa.

[73] Assignee: Westinghouse Electric Corp., Pittsburgh, Pa.

[21] Appl. No.: 160,412

[22] Filed: Jun. 18, 1980

[51] Int. Cl.³ ................................................ G01D 5/34
[52] U.S. Cl. ................................ 250/231 SE; 250/227
[58] Field of Search ......... 250/551, 227, 229, 231 SE, 250/237 G; 137/554, 555, 556

[56] References Cited

U.S. PATENT DOCUMENTS

| | | | |
|---|---|---|---|
| 3,717,171 | 2/1973 | Fawkes | 137/554 |
| 3,781,092 | 12/1973 | Sussman et al. | 250/227 |
| 3,903,496 | 9/1975 | Stimler | 340/2 |
| 3,999,074 | 12/1976 | Callaghan | 250/551 |
| 4,162,399 | 7/1979 | Hudson | 250/227 |
| 4,208,579 | 6/1980 | Scrivo et al. | 250/551 |

*Primary Examiner*—David C. Nelms
*Attorney, Agent, or Firm*—D. Schron

[57] ABSTRACT

A sensing mechanism for determining the open or closed condition of a valve member located at a remote location. First and second optical fiber sections are aligned with a rotatable light modulator between the sections. Rotational movement of the modulator is governed by movement of a portion of the valve such that the light transmitted through the modulator may be detected to provide an indication of valve condition.

5 Claims, 13 Drawing Figures

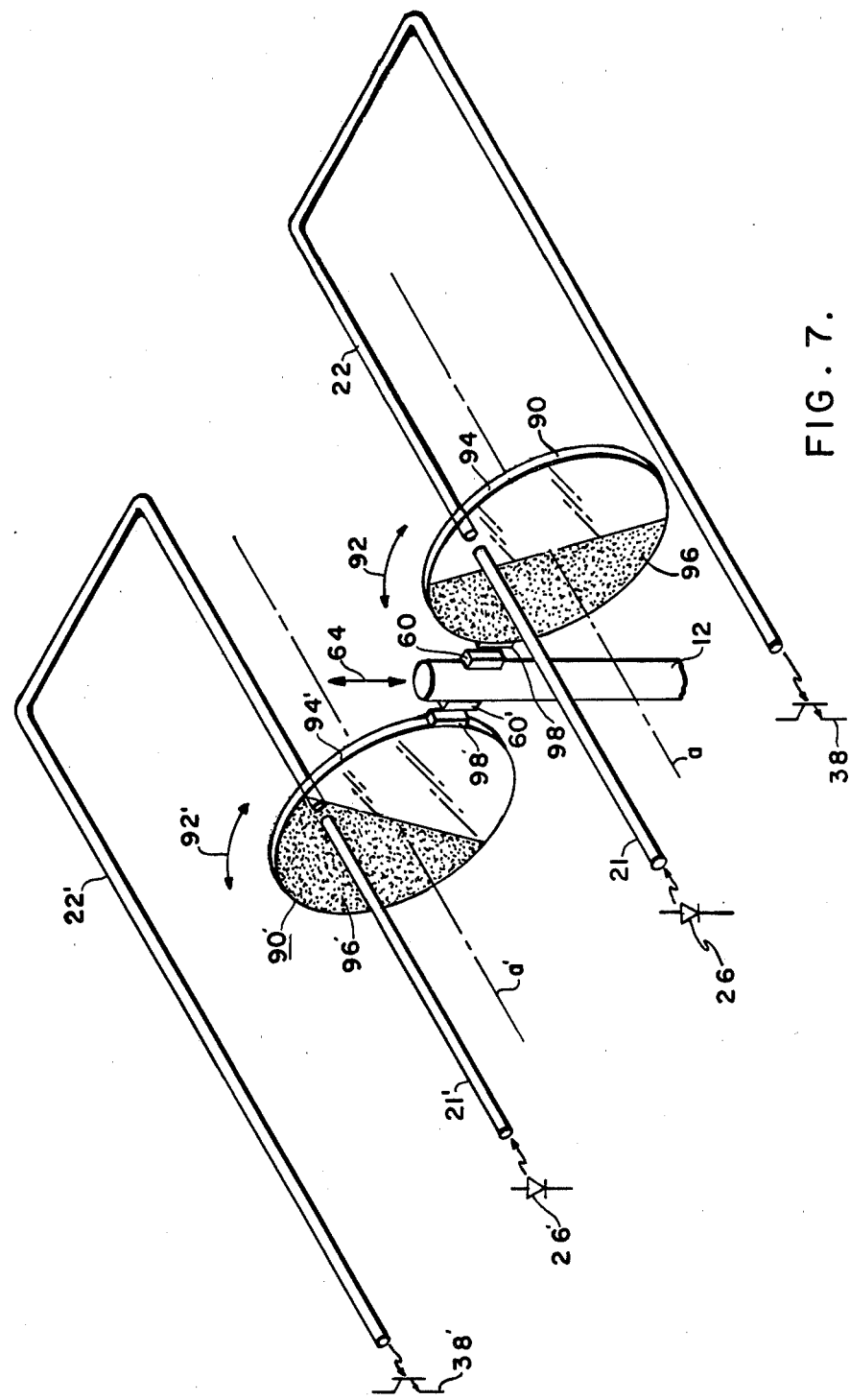

OPTICAL VALVE POSITION SENSOR SYSTEM

BACKGROUND OF THE INVENTION

1. Field of the Invention

The invention in general relates to a remote sensing of the open or closed condition of a valve, and particularly to such sensing by optical means.

2. Description of the Prior Art

A requirement often exists for sensing the open or closed condition of a valve, and for communicating that condition to a remote location. Various such systems include the use of electrical sensors which do not lend themselves to use in certain hostile environments.

For example, in the field of underwater oil production, the underwater production satellite well contains a number of control valves, the respective conditions of which are to be monitored from a remote station, such as a control platform at the water surface.

Present methods of monitoring positive valve position at the subsea wellhead include the use of electrical limit switches or electrical pressure transducers on the subsea valve actuators. At times, various segments of the subsea production system must be remotely retrieved and as such, the electrical circuit communicating the valve status information must be broken and reconnected under water at ambient pressure. A number of disadvantages are attendant with such operation. For example the electrical connection is subject to short circuiting due to the encroachment of seawater and is further subject to open circuiting due to contamination and corrosion. Sophisticated means for entirely excluding sea water from entering the connection prohibitively adds to the cost of the system. The present invention eliminates the need for such electrically operated switches and electrical connections while still providing a positive indication of valve condition.

SUMMARY OF THE INVENTION

The valve condition sensor in accordance with the present invention utilizes optical techniques and includes optical fiber means defining first and second separated, but optically aligned light conducting sections. A light transmitter is provided to project a light beam into the first section and a light receiver means is positioned to intercept any of the light emanating from the second section. A rotatable light modulating means is disposed between the first and second sections and is operable to modulate the passage of light from the first to the second section in accordance with the positional orientation of the rotatable light modulator. This modulator is positioned next to the valve to be monitored. The monitored valve includes a movable member the position of which is indicative of the degree of opening of the valve and means are provided for communicating movement of this movable member to the rotatable light modulating means to thereby rotate it and change its positional orientation such that the light receiver means thereby may provide an indication of the light transmitted through the modulator, such being an indication of the valve position.

BRIEF DESCRIPTION OF THE DRAWINGS

FIG. 7 illustrates another embodiment of the invention;

DESCRIPTION OF THE PREFERRED EMBODIMENTS

Figure 1:
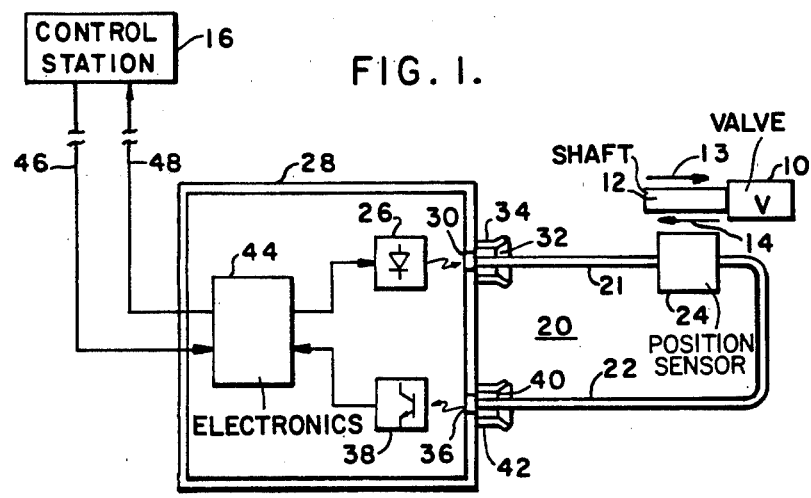
FIG. 1 schematically illustrates one embodiment of the present invention.

Although the invention finds applicability with a variety of systems wherein the condition of a valve is to be monitored from a remote location, it will be described with respect to an underwater environment. In FIG. 1 valve 10 may be positioned on a subsea "Christmas tree" of a production well, the valve including a movable member 12, such as a shaft, movable in the direction of arrow 13 as the valve is closed and movable in the direction of arrow 14 when the valve is open.

The degree of opening of the valve 10 must be monitored by a control station 16 which may be located at the surface. The apparatus includes optical fiber means 20 having first and second separated but optically aligned light conducting sections 21 and 22 with a position sensor mechanism 24 positioned therebetween.

A light transmitter 26 disposed within a waterproof housing 28 is arranged to project a light beam into the first section 21 through an optical window 30 of housing 28. Light conducting section 21 includes a connector portion 32 which is mateable with a capture and alignment member 34 connected to housing 28. Use of optical grade greases and lubricants is recommended between mating members 32 and 34 to aid in the removal of seawater and to improve light coupling.

Any light transmitted into light conducting section 21 and which passes into light conducting section 22 is directed through optical window 36 to a light receiver or detector 38, also disposed within housing 28. The end of section 22 also includes a connector portion 40 mateable with a capture and alignment member 42.

An electronics section 44 receives power from control station 16 by means of line 46 and is operable to provide light transmitter 26 with a signal for transmitting a light beam into the optical fiber means arrangement 20. Electronics section 44 also is operable to receive any signal provided by the light receiver 38 and to interpret such signal to provide an indication thereof to control station 16 by means of line 48.

Figure 2:
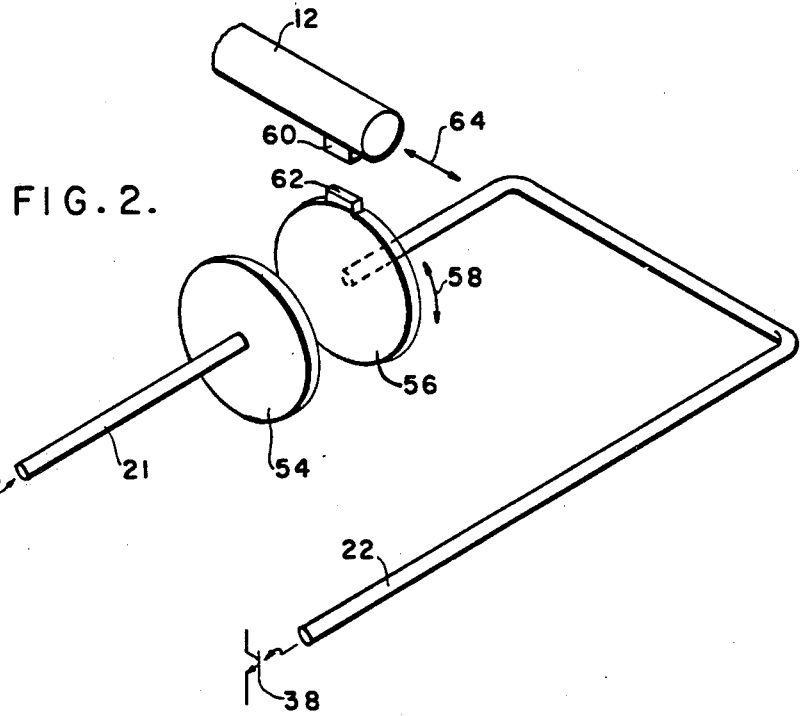
FIG. 2 is a view further illustrating the operation of the embodiment of FIG. 1.

The position sensor mechanism 24 includes rotatable light modulating means which is responsive to movement of shaft 12 to thereby modulate the light transmitted from section 21 to section 22 such that the output of the electronics section 44 will be an indication of the position of shaft 12 and therefore an indication of the degree of opening of valve 10. One mechanism for accomplishing this modulation is illustrated in FIG. 2.

In one embodiment the apparatus includes a stationary optical polarizer 54 and an optical analyzer 56 which is bidirectionally rotatable as indicated by arrow 58.

Valve shaft 12 includes a magnet arrangement 60 thereon which is in proximity to a magnetically responsive member 62 disposed on analyzer 56. Thus, as shaft 12 moves in and out as indicated by arrow 64 the attraction between magnet arrangement 60 and member 62 will cause the rotation of analyzer 56 in proportion to the movement of shaft 12. The positional orientation of analyzer 56 then is an indication of the degree of opening of the valve to which shaft 12 is connected, and it is this positional orientation which also modulates the intensity of the light transmitted from light conducting section 21 to section 22.

Figure 3:
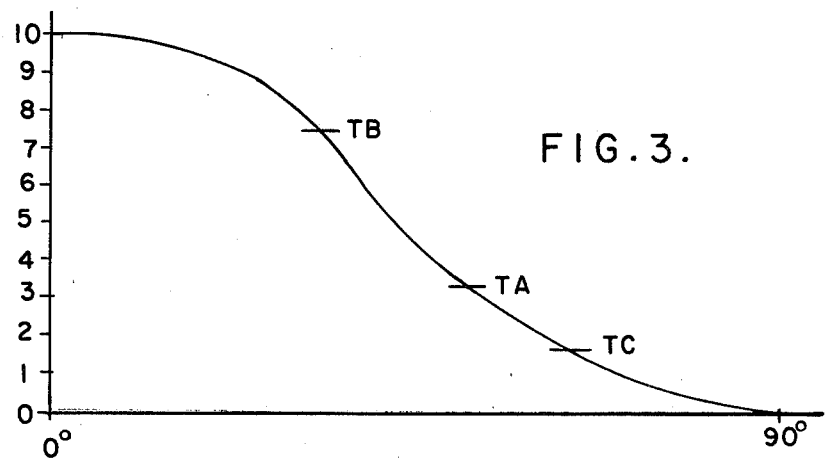
FIG. 3 is a curve illustrating the operation of the embodiment illustrated in FIG. 1.

This modulation of light intensity as a function of positional orientation of analyzer 56 is graphically illustrated in FIG. 3 wherein positional orientation in degrees is plotted on the horizontal axis and relative light transmitted by analyzer 56 is plotted on the vertical axis. Within the limited degree of movement of analyzer 56 certain threshold points TA, TB and TC are established on the curve and provide an indication of valve condition. Thus if the light intensity received by detector 38 is above threshold TB this may be an indication that the valve is in an open condition. If the light intensity falls below threshold TA it may be an indication that the valve is in the closed condition. If the intensity falls below an arbitrary threshold level TC this may provide an indication that some sort of fault has occurred in the mechanism.

Figure 4:
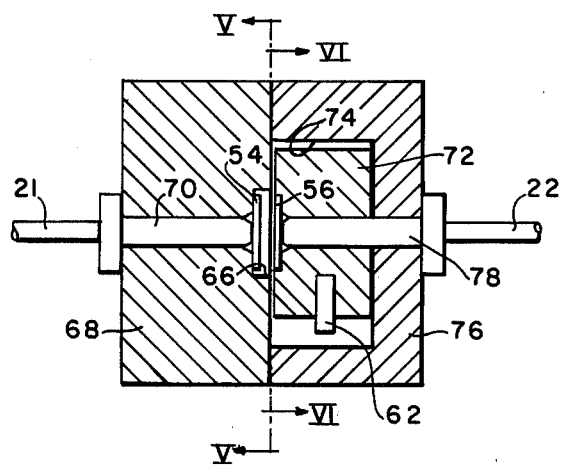
FIG. 4 is an axially cross-sectional view of a mechanism operable in the embodiment of FIG. 1.
Figure 5:
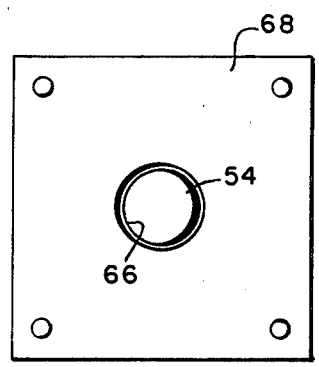
FIGS. 5 and 6 are respective views along lines V—V and VI—VI of FIG. 4.
Figure 6:
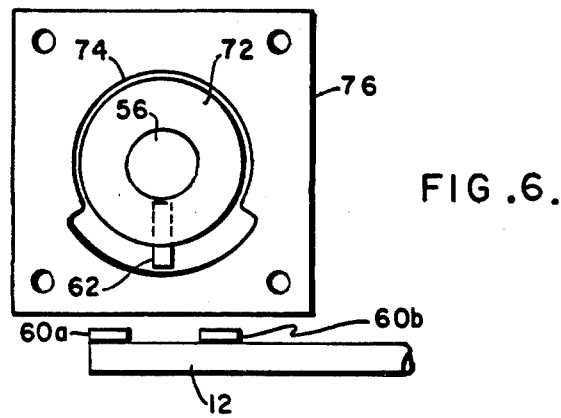

FIGS. 4, 5 and 6 further illustrate a position sensor mechanism 24 in accordance with the polarization embodiment of FIG. 2. Polarizer 54 may be affixed in a recess 66 of a housing portion 68 having a central aperture therethrough for receipt of an optical connector 70 which terminates the end of light conducting section 21.

The analyzer 56 is firmly affixed to a member 72 within recess 74 of housing portion 76 and has a central aperture therethrough positioned around optical connector 78 and is rotatable thereabout. Optical connector 78 is in optical communication with one end of light conducting section 22. Magnetically responsive member 62, affixed to rotatable member 72 is attracted by the magnet arrangement on the valve shaft to cause rotation of member 72 and consequently rotation of analyzer 56 within the limits of angle $\theta$, to cause the aforedescribed light modulation. This operation may be illustrated in FIGS. 6A and 6B which show the magnetically responsive member 62 of FIG. 6 in its two extremes of travel.

Figure 6A:
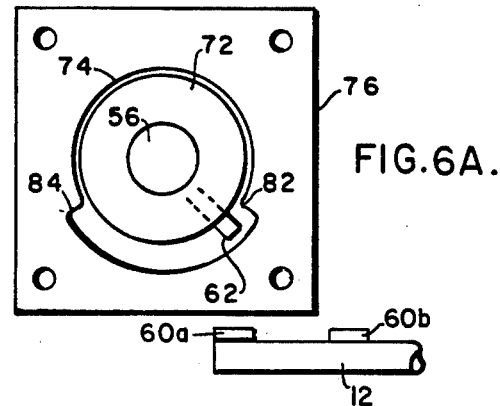
FIGS. 6A and 6B illustrate the rotational operation of the mechanism of FIG. 6.

By way of example the magnet arrangement 60 may include two separated magnets 60a and 60b secured to valve shaft 12. In FIG. 6A the magnetically responsive member 62 is at a right stop position determined by portion 82 of housing 76, and in such position may indicate a closed valve condition.

Figure 6B:
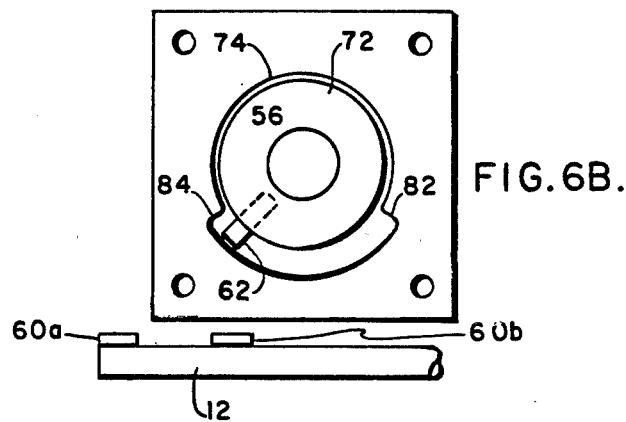

When the valve opens, shaft 12 moves to the left (in FIG. 6A) and magnet 60a causes clockwise rotation of member 72 (and therefore analyzer 56) until magnetically responsive member 62 arrives at a left stop position as determined by portion 84 of housing 76 and as illustrated in FIG. 6B. The magnetic force of magnet 60b maintains the arrangement in this position.

Upon closing, shaft 12 will move to the right and magnet 60b will cause counterclockwise rotation of member 72 until magnetically responsive member 62 again assumes the position illustrated in FIG. 6A and is held there by magnet 60a.

If desired, the recesses may be filled with a light transmitting fluid so as to provide for pressure compensation at the operating depths. This fluid would also improve the coupling of light conducting sections 21 and 22.

Under certain circumstances it would be desirable to provide an information signal which is not dependent upon amplitude, as is the case with respect to the embodiment of FIG. 2. In the embodiment of the invention illustrated in FIG. 7, the dependence on light amplitude is eliminated and the embodiment lends itself readily to digital processing techniques.

Interposed between light conducting sections 21 and 22 is a shutter 90 rotatable about a central axis, a, bidirectionally, as indicated by arrow 92. Shutter 90 includes a transparent section 94 which allows the transmission of light, and an opaque section 96 which blocks the transmission of light from light conducting section 21 to section 22.

Shutter 90 includes a magnetically responsive member 98 on the periphery thereof so that when shaft 12 moves, magnet arrangement 60 will cause rotation of shutter 90. If shaft 12 is illustrated in its lowermost position indicating a closed valve, movement to its open position will cause the opaque section 96 of shutter 90 to interpose itself between the first and second light conducting sections 21 and 22 such that the absence of an output signal from detector 38 will be indicative of the valve condition. In order however to provide for a more positive indication a second and similar arrangement is provided, as indicated by the primed reference numerals with the difference being in the initial angluar orientation of the shutter members 90 and 90'. That is to say, and as indicated in FIG. 7, the shutters are oriented such that when one allows light conduction the other will block it, and vice versa. Thus as illustrated, detector 38 will provide an output signal whereas detector 38' will not. When the shaft moves to an uppermost position causing clockwise rotation of shutter 90 and counterclockwise rotation of shutter 90', the situation will reverse itself such that detector 38 will not provide an output signal whereas detector 38' will.

Figure 8:
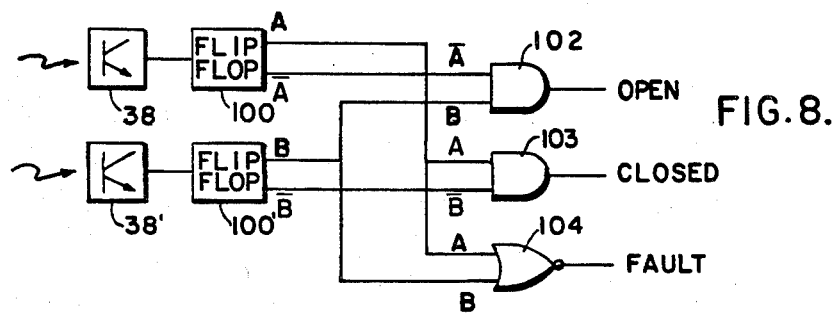
FIG. 8 is a circuit diagram illustrating the operation of the embodiment of FIG. 7.

The position of valve shaft 12 and consequently the open or closed condition of the valve may be communicated to the surface control station by means of the interpretation circuitry illustrated in FIG. 8. The circuitry includes two flip-flops 100 and 100' responsive respectively to the output signals of detectors 38 and 38'. If detector 38 provides an output signal it will set flip-flop 100 such that the A signal is high and the $\overline{A}$ is low. If detector 38 provides an output signal, detector 38' does not and the condition of flip-flop 100' will be such that the B output signal is low and the $\overline{B}$ output signal is high. The flip-flop outputs are provided to a series of gates 102 to 104, gates 102 and 103 being AND gates and gate 104 being an exclusive NOR gate. Thus for the condition illustrated in FIG. 7 corresponding to a closed valve, detector 38 provides an output signal and detector 38' does not. Signals A and $\overline{B}$ are in a high state whereas signals $\overline{A}$ and B are in a low state. The two high state signals provided to AND gate 103 causes an output signal therefrom indicating a closed condition.

Movement of the valves stem to its opposite extreme when the valve is open will cause detector 38' to provide an output signal making signal B high and $\overline{B}$ low whereas the condition of detector 38 will cause signal $\overline{A}$ to be high and A to be low. The two high signals provided to AND gate 102 will therefore cause an output signal therefrom indicating an open position.

Should a malfunction occur such that either two transparent sections are provided in the light path, or two opaque sections, detectors 38 and 38' will either both provide an output signal or both not provide an output signal. This condition may be indicated by an output signal from exclusive NOR gate 104, indicative of a fault condition.

Figure 9:
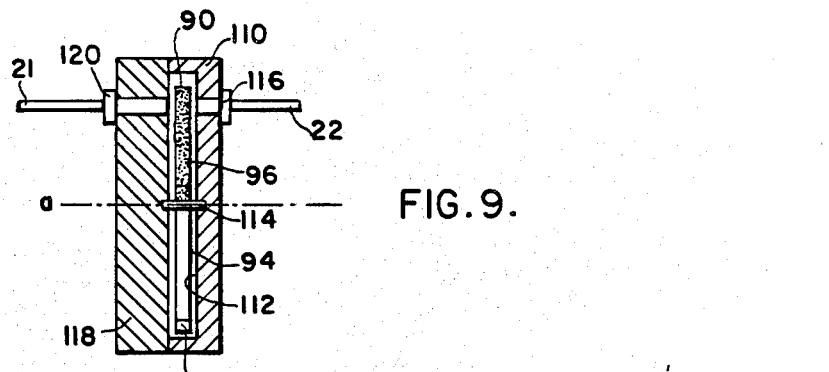
FIG. 9 is an axial cross-sectional view illustrating a housing for one of the discs illustrated in FIG. 7.

A typical shutter arrangement is illustrated in an axial cross-sectional view in FIG. 9. Housing portion 110 includes a recess 112 for receipt of shutter 90 rotatable about a pivot pin 114. Light conducting section 22 is secured to housing portion 110 by means of optical connector 116. Housing portion 118 merely includes optical connector 120 for terminating one end of light conducting section 21.

Figure 10:
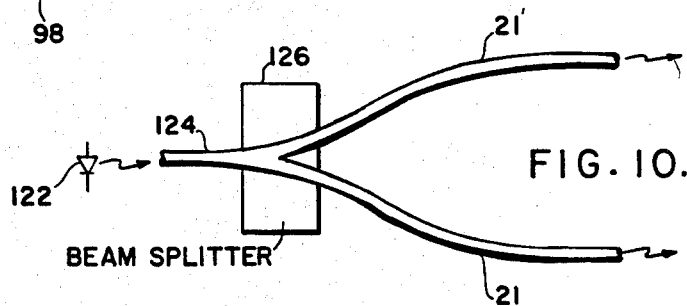
FIG. 10 illustrates the production of two light beams from a single light source.

Although the arrangement of FIG. 7 illustrates two distinct light transmitters 26 and 26', a single transmitter 122, as illustrated in FIG. 10, may be utilized. Light transmitter 122 projects a beam of light into optical fiber section 124 and is thereafter split into two beams for transmission in light conducting sections 21 and 21' by means of an optical beam splitter 126.

Figure 11:
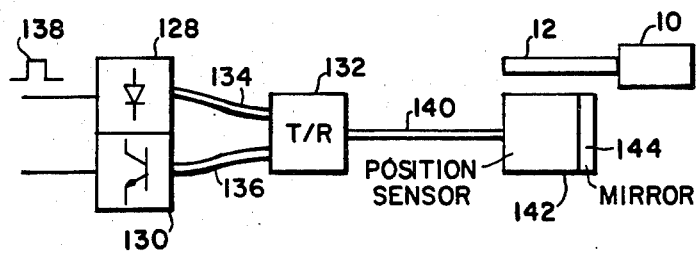
FIG. 11 illustrates operation of the present invention with a dual path optical fiber section.

In the embodiments thus far illustrated, the apparatus is seen to include the first and second separated but optically aligned light conducting sections. FIG. 11 illustrates an embodiment which may eliminate one of these sections by having one optical fiber means function as a bidirectional conductor of light energy. The arrangement includes an optical transmitter 128 and an optical receiver 130 which are connected to an optical transmit/receive switch 132 by means of respective optical fiber means 134 and 136. A signal as indicated by waveform 138 causes light transmitter 128 to provide a pulse of light energy which travels down optical fiber means 140 to a position sensor mechanism 142 located proximate the valve shaft 12 of valve 10. Position sensor mechanism 142 may be of the polarization type or of the optical shutter type previously described. Disposed on position sensor mechanism 142 is a mirror 144 arranged so that light transmitted by the polarizer arrangement or optical shutter arrangement is reflected back along the optical fiber means 140 where the transmit/receive switch 132 directs it to receiver 130.

With the arrangements described herein, the position sensor mechanism and its light conducting sections of optical fiber means may be kept at the remote site while the transmitter, receiver and electronic portion may be separated therefrom for any necessary servicing, and remated after said servicing. Although described with respect to the monitoring of an underwater valve, the apparatus may be used in any remote sensing situation including high electrical noise environments as well as explosive environments.

We claim:

1. A valve condition sensor operable with a valve having a movable member the position of which is indicative of the degree of opening of said valve, comprising:

(A) optical fiber means defining first and second separated but optically aligned light conducting sections;
(B) light transmitter means operable to project a light beam into said first section;
(C) light receiver means positioned to intercept any of said light emanating from said second section;
(D) a light modulating means in the form of a rotatable shutter having both transparent and opaque sections rotatable into the light path between said first and second light conducting sections;
(E) said rotatable light modulating means being positioned proximate said movable member of said valve;
(F) means communicating movement of said movable member to said rotatable light modulating means to thereby rotate it to change its positional orientation;
(G) additional optical fiber means defining third and fourth separated but optically aligned light conducting sections;
(H) optical transmitter and receiver means for transmission of light into and reception of light from said additional optical fiber means;
(I) a second rotatable shutter having both transparent and opaque sections rotatable into the light path between said third and fourth light conducting sections;
(J) said second shutter being rotatable in response to movement of said movable member of said valve; and
(K) said shutters being oriented such that during normal operation only one of said shutters will allow light transmission at a time.

2. Apparatus according to claim 1 which includes
(A) circuit means (i) responsive to light transmitted by one shutter and not the other to provide an output signal indicative of one condition of said valve, (ii) responsive to light transmitted by the other shutter and not the one to provide an output signal indicative of another condition of said valve, (iii) responsive to light transmitted by both shutters at the same time or blocked by both shutters at the same time to provide an output signal indicative of a fault condition.

3. Apparatus according to claim 1 wherein
(A) a single light transmitter projects a light beam into said first and third light conducting sections.

4. Apparatus according to claim 1 wherein:
(A) said optical transmitter means for said optical fiber and said additional optical fiber means are positioned within a waterproof housing;
(B) said housing including optical windows;
(C) respective ends of said optical fiber and said additional optical fiber means being movable into optical engagement with said windows.

5. Apparatus according to claim 4 wherein:
(A) each of said optical window includes a capture and alignment means located externally of said housing to maintain said respective ends in said optical engagement.

* * * * *